Aug. 9, 1949.      G. H. BROWN ET AL      2,478,857
RADIO FREQUENCY HEATING
Original Filed July 31, 1942
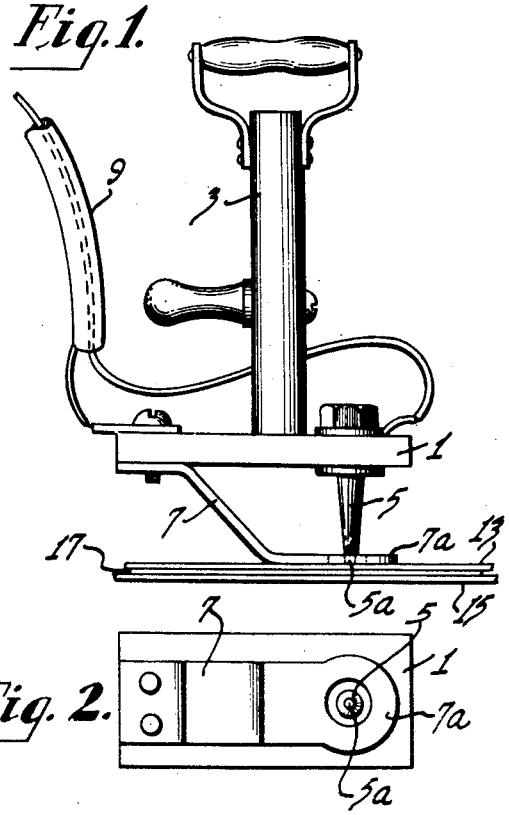
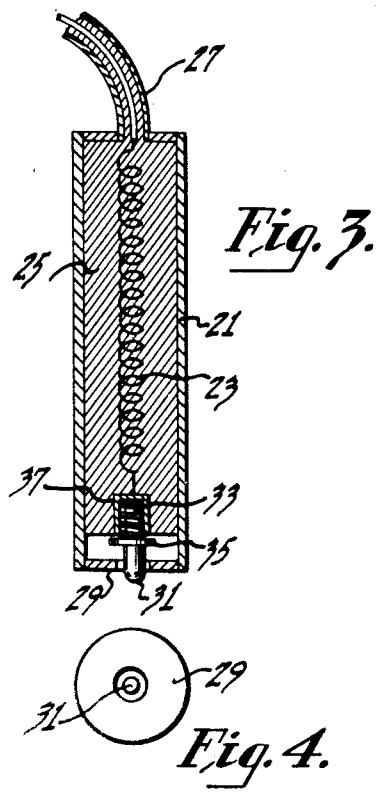
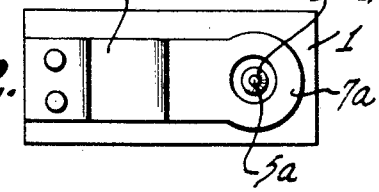
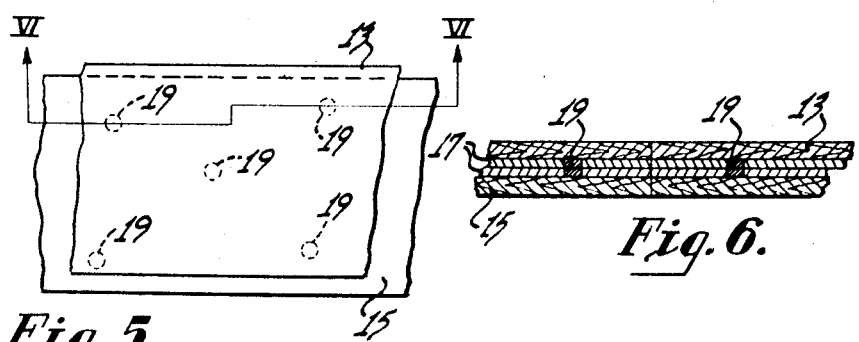
INVENTORS
George H. Brown
& Rudolph A. Bierwirth
BY
ATTORNEY Patented Aug. 9, 1949

UNITED STATES PATENT OFFICE 2,478,857

RADIO-FREQUENCY HEATING

George H. Brown and Rudolph A. Bierwirth, Princeton, N. J., assignors to Radio Corporation of America, a corporation of Delaware Original application July 31, 1942, Serial No. 453,134. Divided and this application December 22, 1945, Serial No. 636,971

4 Claims. (Cl. 154—126.5)

This invention relates to heating methods employing high frequency electrical energy, and more particularly to a heating method of the type specified which is especially suited for use in joining together laminated dielectric materials by means of a thermoplastic or thermo-setting bonding agent, the present application being a division of our copending application Serial No. 453,134, filed July 31, 1942, now Patent 2,422,525.

In certain industrial applications, as in the manufacture of laminated wood structures wherein the laminations are glued together under the influence of heat and pressure in a molding or forming operation, it has been found necessary to temporarily join together the layers or laminations in order to maintain them as a unit prior to subjecting them to the treatment by which they become permanently set in the desired form. This is particularly true where the sheet laminations are large, as in the case of airplane bodies made from relatively thin and long laminations of wood or the like. In order to hold the laminations together as a unit prior to subjecting them to the setting treatment, it has been customary to join them at spaced points by means of staples or the like. These staples must, however, later be removed after the laminated structure has been set in the desired shape, as they may have a deleterious effect on the structure, so that the staples not only constitute a complete waste insofar as the finished product is concerned, but also considerable time is wasted in removing them.

The primary object of our present invention is to provide an improved method of effecting more or less temporary joints between the several layers of a laminated structure composed of dielectric materials which are to be bonded together by a bonding agent, which method will be free from the aforementioned disadvantages.

More particularly, it is an object of our present invention to provide an improved method of joining together the layers of a laminated structure as aforesaid which will eliminate the need for extraneous joining materials and which will make use of only the materials entering into the final, composite structure.

Another object of our present invention is to provide an improved heating method which involves simultaneously applying radio frequency heating and pressure to small areas of dielectric laminations coated with thermoplastic or thermosetting glue for the purpose of securing the laminations to each other at those areas.

Still another object of our present invention is to provide an improved heating method as aforesaid which can be practiced on the laminated structure from only one side thereof to effect the desired result.

It is also an object of our present invention to provide an improved heating method as above described which can be carried out in a simple manner, which is inexpensive to practice, and which is highly efficient.

In accordance with this invention, coupling of the heating device to the glue is accomplished from one side of the sheet material by means of two electrodes one of which is annular in shape and the other of which is circular in cross-section and is concentric with the first electrode. The circular, center electrode is suitably spaced from the annular electrode, and the two electrodes are so supported and related to each other that the center electrode may be caused to exert relatively great pressure on the material. The electric field set up between the two electrodes, being radial, is most highly concentrated at the tip of the center electrode, and the stray field, thus concentrated, is used to activate the glue. Since the pressure is greatest at the tip of the center electrode and most of the heat is developed under it, the laminations will be bonded together over an area which is substantially equal to the area of the tip of the center electrode. Thus, it will be obvious that a sort of "spot welding" results wherever the center electrode contacts the work. A plurality of such "spot welds" may be used to temporarily unite the sheet laminations for subsequent, further treatment which will unite the laminations permanently and set them in the desired shape or form.

The novel features that we consider characteristic of our invention are set forth with particularity in the appended claims. The invention itself, however, as well as additional objects and advantages thereof, will best be understood from the following description of two forms of apparatus which are designed to utilize this invention, when read in connection with the accompanying drawing, in which Figure 1 is a side elevation of one form of heating device constructed to operate in accordance with our present invention, Figure 2 is a bottom plan view thereof, Figure 3 is a central, longitudinal, sectional view of another form of heating device constructed to operate according to our present invention, Figure 4 is a bottom plan view of the latter form of apparatus, Figure 5 is a fragmentary plan view of two sheets or laminations joined together in accordance with our present invention, and Figure 6 is a sectional view taken on the line VI—VI of Figure 5 and exaggerated somewhat as to thickness for the sake of clearness.

Referring in greater detail to the drawing, wherein similar reference characters designate corresponding parts throughout, there is shown, in Figs. 1 and 2, a supporting plate 1 of dielectric material to which is connected and from one side of which there extends a manipulating handle 3. Also connected to the supporting member 1 and extending from the opposite side thereof are a pair of electrodes 5 and 7. The electrode 5 is rigid and terminates in a tip 5a which is circular in cross section. The electrode 7 is made of a strip of material which is somewhat resilient and terminates in an annular portion 7a which surrounds and is concentric with the tip 5a of the electrode 5, the tip 5a having an area which is a small fraction of the area of the annular portion 7a. Connection to a suitable source of radio frequency energy, such as an oscillation generator (not shown), may be made by a concentric line 9 in well known manner.

The electrode 7 is so set that normally the annular portion 7a thereof occupies a position slightly in advance of the electrode tip 5a. In applying the device to the outer surface of a pair of sheet laminations 13 and 15 between the facing surfaces of which is interposed a layer of glue 17, the annular electrode portion 7a is first brought into engagement with the surface of one of the sheets, for example, the sheet 13. When pressure is applied against the work through the manipulating handle 3, the electrode 7 yields until the tip 5a is also in engagement with the lamination 13. The circuit may then be completed, as by a switch on the handle 3 (not shown), whereupon an electric field is set up between the electrodes 5a and 7a. This field includes a direct field component as well as a stray field component between the two electrodes, the fields being most highly concentrated at the electrode tip 5a by reason of the fact that it extends radially. The stray field component is availed of to energize or activate the glue or the like 17 for the purpose of heating and thereby softening it, and since the pressure per unit area is relatively great under the tip 5a, it is obvious that a bond will be readily effected over an area under and substantially equal to the cross-sectional area of the electrode tip 5a. A plurality of such bonding areas 19 may be provided at spaced points over the laminations 13 and 15, and these will serve effectively to temporarily hold the sheets 13 and 15 together until they are permanently united.

In one construction according to the form of apparatus just previously described, the electrode 7 was made of one-eighth inch brass shaped as shown in Fig. 1, and the center electrode 5 was made of one-quarter inch brass rod tapered down to one-eighth inch at the tip 5a and rounded off at the tip to reduce the possibility of arcing. The supporting plate or member 1 was made of a Bakelite block. This construction was employed to provide temporary joints between two sheets of mahogany veneer one-thirty-second inch thick, and each coated with a phenolic thermosetting glue on the facing surface thereof. The device was connected to an oscillation generator which supplied energy at 16 megacycles, and the power required was about 20 watts to heat the small areas 19 to approximately 240° F. in one second. Frequencies of from 5 megacycles up were also employed successfully.

In the form of apparatus shown in Figs. 3 and 4, the heating device consists of a cylindrical, metal tube 21 which forms the outer conductor of a concentric line. The inner conductor consists of a coil 23 embedded in a layer of polystyrene 25 or other suitable dielectric which will maintain the conductors 21 and 23 in suitably spaced relation. The concentric line 21, 23 is connected to a suitable oscillation generator through a flexible cable or the like 27.

The tubular conductor 21 is provided at its lower end with a radially inwardly extending, annular terminal member 29 constituting the outer electrode corresponding to the electrode 7a of Fig. 1. Spaced from and concentric with the electrode 29 is an inner electrode 31 which, like the electrode 5, terminates in a tip which is rounded off and has a circular cross-section. The electrode 31 has a shank surrounded by a coil spring 33 which is interposed between a shoulder 35 and the end of a tubular, conductive socket 37 fitted into a corresponding seat in the lower end of the spacer 25 and conductively coupled to the coil 23.

The spring 33 serves to normally project the electrode 31 to a position such that its tip is located slightly beyond the electrode 29. When the tip 31 is brought into engagement with the outer surface of the sheet 13 and pressure is applied thereto, the spring 33 yields and permits the annular electrode 29 also to be brough into engagement with the work surface. However, the pressure per unit area and the strength of the electric field are both greatest under the tip of the electrode 31. Consequently, the small joints or "spot welds" 19 will result similarly to those obtained with the apparatus of Fig. 1. The length of the concentric line 21, 23 is preferably about a quarter wave length at the operating frequency, which may be from 30 to 40 megacycles. In this way, a low voltage may be supplied by the oscillator through the flexible cable 27 to the upper end of the concentric line and, because the device represents a quarter wave length, a standing wave will be established which will result in a high voltage at the lower end of the line between the electrodes 29 and 31.

Although we have shown and described but two forms of apparatus for carrying out our invention, it will be obvious to those skilled in the art that many other forms thereof, as well as variations in the ones described, are possible. We, therefore, desire that our invention shall not be limited except insofar as is made necessary by the prior art and by the spirit of the appended claims.

We claim as our invention:

1. The method of effecting a union between a plurality of layers of sheet material for a laminated body having therebetween a bonding agent adapted to be activated by heating, which comprises successively activating said bonding agent through one side of said layers of sheet material at a plurality of spaced points over an area at each of said points which is relatively small compared to the area of the sheet material while applying pressure to the material only at each of said points from said one side of said layers of sheet material and simultaneously with the activation of the bonding agent to effect a temporary union between said layers, and thereafter heat activating the remainder of the bonding agent to effect a permanent and complete union between said layers of material throughout the whole area embraced by said bonding agent.

2. The method of effecting a union between two sheets of material having therebetween a bonding agent adapted to be activated by heat to unite said sheets into a composite laminated body, which comprises simultaneously and from only one side of said material applying high frequency heating to said agent and pressure to said material over the same relatively small area and successively to each of a plurality of spaced small areas to bond said sheets at said plurality of small areas, and thereafter heat activating the remainder of said bonding agent without the application of pressure to the material to bond said sheets throughout the whole area embraced by said bonding agent.

3. The method of uniting a pair of sheet laminations for a laminated body by means of a heat activatable bonding agent disposed between and in contact with each of said laminations, which comprises successively heat activating said bonding agent at only a plurality of spaced points along said laminations over an area at each of said points which is small compared to the areas of said laminations, simultaneously successively applying pressure only to said points thereby to effect a temporary bond between the said laminations both said heat activation and said pressure application being impressed from the same side of said laminated body, and thereafter heat activating the remainder of said bonding agent without pressure application to said laminations to effect a permanent bond between said laminations throughout the whole area embraced by said bonding agent.

4. The method of uniting a pair of sheet laminations for a laminated structure by means of a heat activatable bonding agent disposed between and in contact with each of said laminations, which comprises subjecting said laminations to pressure and simultaneously subjecting said bonding agent to the influence of a high frequency electric field successively at each of a plurality of spaced points along said laminations over an area at each of said points which is small compared to the lamination area, said field serving to produce dielectric losses in said bonding agent sufficient to heat activate it at said points and said simultaneous pressure serving to hold said laminations together at said points, thereby to effect a temporary bond between said laminations, and thereafter heat activating the remainder of said bonding agent to effect a permanent and complete bond between said laminations throughout the whole area embraced by said bonding agent.

GEORGE H. BROWN.
RUDOLPH A. BIERWIRTH.

REFERENCES CITED

The following references are of record in the file of this patent:

UNITED STATES PATENTS

| Number | Name | Date |
| --- | --- | --- |
| 1,146,292 | Wappler | July 13, 1915 |
| 2,317,281 | Linquist | Apr. 20, 1943 |
| 2,354,714 | Strickland, Jr. | Aug. 1, 1944 |
| 2,370,883 | Smith | Mar. 6, 1945 |
| 2,397,615 | Mittlemann | Apr. 2, 1946 |